(12) United States Patent
Oklejas et al.

(10) Patent No.: US 8,579,603 B2
(45) Date of Patent: Nov. 12, 2013

(54) CENTRIFUGAL PUMP

(75) Inventors: Robert A. Oklejas, Monroe, MI (US);
Kevin V. Terrasi, Monroe, MI (US);
Michael P. Oklejas, Ann Arbor, MI (US)

(73) Assignee: Energy Recovery, Inc., San Leandro, CA (US)

( * ) Notice: Subject to any disclaimer, the term of this patent is extended or adjusted under 35 U.S.C. 154(b) by 250 days.

(21) Appl. No.: 11/179,183

(22) Filed: Jul. 12, 2005

(65) Prior Publication Data
US 2006/0013707 A1    Jan. 19, 2006

Related U.S. Application Data

(60) Provisional application No. 60/588,016, filed on Jul. 13, 2005.

(51) Int. Cl.
*F04B 17/00* (2006.01)

(52) U.S. Cl.
USPC .......................................................... 417/407

(58) Field of Classification Search
USPC ............ 417/407, 408, 409; 415/214.1, 215.1, 415/915, 196, 197, 204, 205, 206, 207, 415/212.1, 910, 203
See application file for complete search history.

(56) References Cited

U.S. PATENT DOCUMENTS

| | | | |
|---|---|---|---|
| 2,007,954 A * | 7/1935 | Carlson | 415/196 |
| 2,283,126 A * | 5/1942 | Ray | 239/591 |
| 2,685,652 A * | 8/1954 | Wales | 290/52 |
| 2,879,029 A * | 3/1959 | Wienola | 415/135 |
| 3,091,182 A * | 5/1963 | Anderson et al. | 415/197 |
| 3,162,135 A * | 12/1964 | Nichols et al. | 415/196 |
| 3,182,897 A * | 5/1965 | Trumpler | 417/351 |
| 3,228,656 A * | 1/1966 | Takeji | 415/131 |
| 3,552,876 A * | 1/1971 | Updike | 415/205 |
| 3,656,861 A * | 4/1972 | Zagar | 415/109 |
| 3,930,747 A * | 1/1976 | Woollenweber | 415/205 |
| 3,953,150 A | 4/1976 | Onal | |
| 4,004,541 A | 1/1977 | Onal | |
| 4,120,605 A * | 10/1978 | Hurst | 415/197 |
| 4,247,250 A | 1/1981 | Lipe et al. | |
| 4,277,223 A | 7/1981 | Nelson | |
| 4,691,423 A * | 9/1987 | Willyard et al. | 29/888.025 |
| 4,893,986 A * | 1/1990 | Catterfeld et al. | 415/100 |
| 4,917,571 A * | 4/1990 | Hyll et al. | 415/197 |
| 5,040,946 A | 8/1991 | Caoduro | |
| 5,049,045 A * | 9/1991 | Oklejas et al. | 417/365 |
| 5,207,560 A | 5/1993 | Urban | |
| 5,551,839 A | 9/1996 | Schuster et al. | |
| 5,558,502 A * | 9/1996 | Fukazawa et al. | 417/36 |
| 5,947,682 A | 9/1999 | Moon | |

(Continued)

*Primary Examiner* — Peter J Bertheaud
*Assistant Examiner* — Dnyanesh Kasture
(74) *Attorney, Agent, or Firm* — Carr & Ferrell LLP

(57) ABSTRACT

A hydraulic turbocharger having an outer housing having a first section, a turbine end section and a pump end section. The pump end and turbine end sections are removably secured to the first section. A first cavity being formed between the first section and the turbine end section. A second cavity being formed between the first section and the pump end section. A first insert positioned in the first cavity and a second insert positioned in the second cavity. The first and second inserts being formed have more than one piece and defining a volute passageway in the first and second cavities respectively. The first and second inserts being designed to be capable of being machined to form the volute passageway.

9 Claims, 18 Drawing Sheets

(56) References Cited

U.S. PATENT DOCUMENTS

| | | | |
|---|---|---|---|
| 6,164,404 A * | 12/2000 | Hinrichs | 180/367 |
| 6,220,234 B1 * | 4/2001 | Baker et al. | 60/605.1 |
| 6,345,961 B1 * | 2/2002 | Oklejas, Jr. | 417/365 |
| 6,422,014 B1 | 7/2002 | Gladden | |
| 6,588,228 B2 * | 7/2003 | Choi | 62/426 |
| 6,712,588 B1 * | 3/2004 | Ribaud | 417/407 |
| 6,767,185 B2 * | 7/2004 | Martin et al. | 415/205 |
| 6,896,495 B2 * | 5/2005 | Majerus et al. | 417/454 |
| 7,189,260 B2 * | 3/2007 | Horvath et al. | 623/3.13 |
| 2004/0126228 A1 * | 7/2004 | Roudnev et al. | 415/196 |
| 2005/0100460 A1 * | 5/2005 | Dolson | 417/423.3 |

* cited by examiner

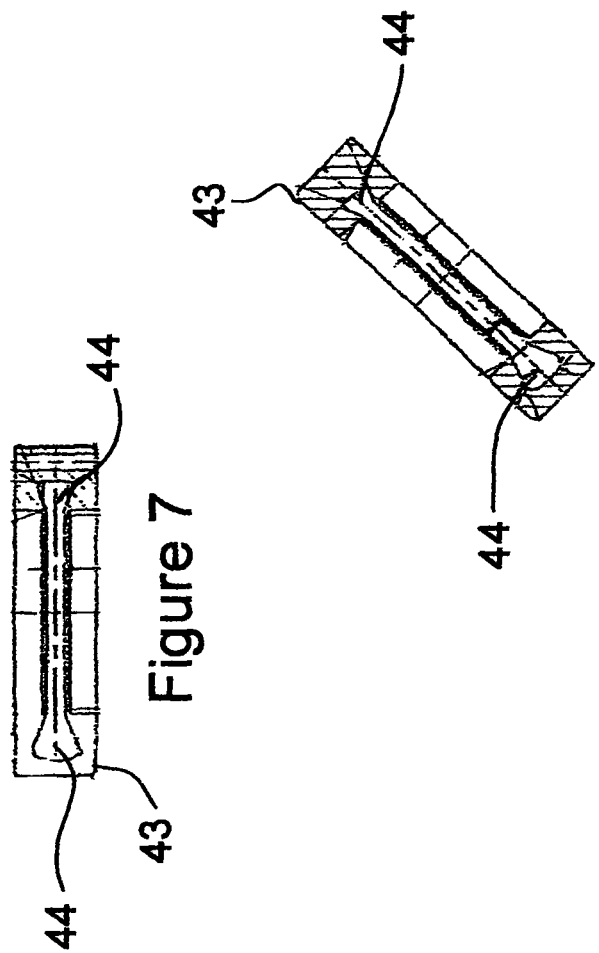

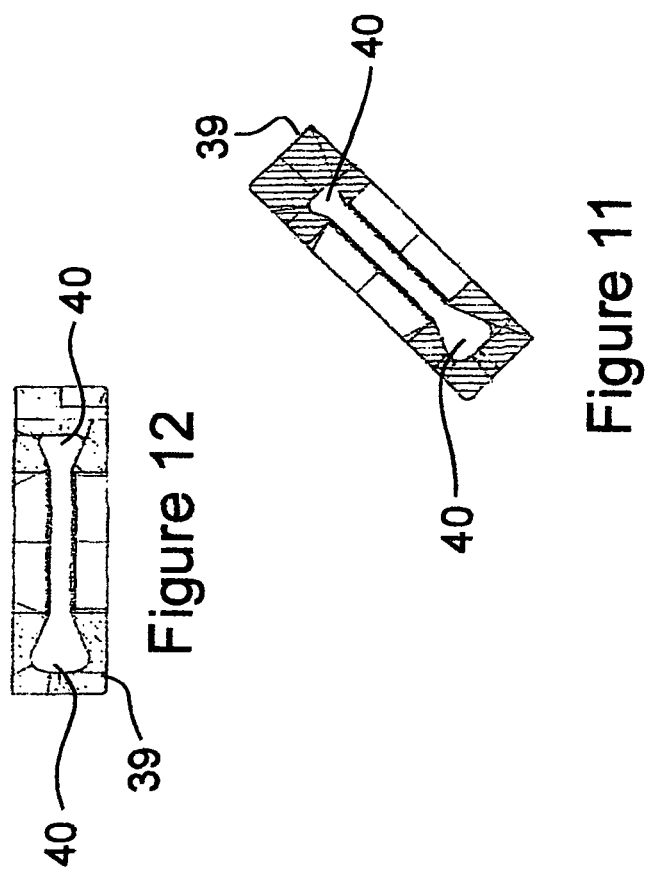

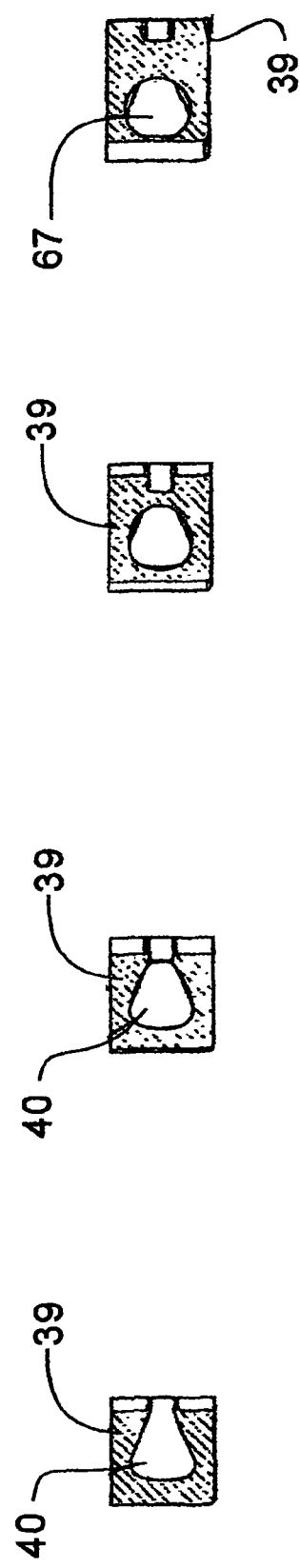

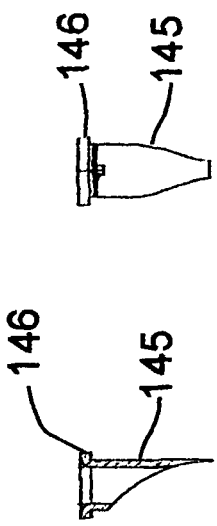
Figure 34
Figure 35
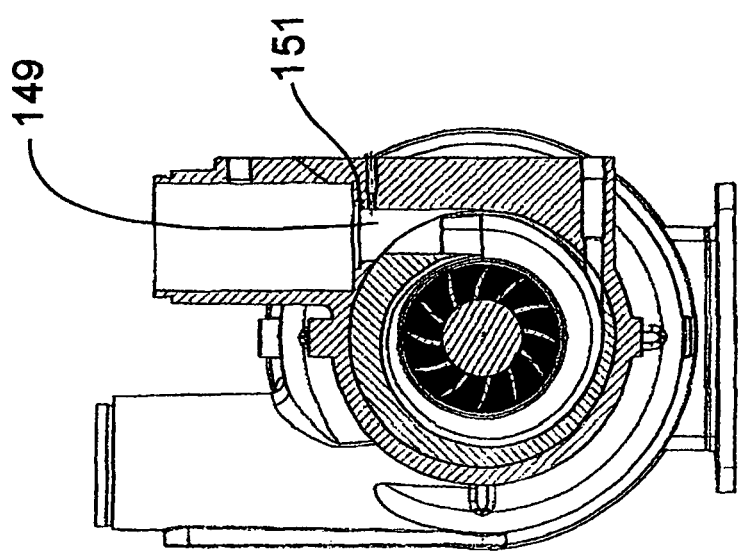
Figure 33

CENTRIFUGAL PUMP

CROSS REFERENCE TO RELATED APPLICATIONS

This U.S. application claims the benefit of U.S. provisional application Ser. No. 60/588,016 filed Jul. 13, 2005.

BACKGROUND OF THE INVENTION

The present invention relates generally to a pump construction and more particularly the internal passageways of the pump.

The pump industry now has available computational fluid dynamic based machine design software that allows pumps to be designed to achieve various performance parameters. The resultant designs require a high degree of dimensional precision to obtain the desired performance characteristics. The challenge is to convert the complex computer design into actual components.

To produce the desired geometry for internal casing components, investment castings are often used. Investment castings use metal molds that produce a wax pattern that in turn is used to make a ceramic mold. The wax pattern is then heated so that the wax melts and is removed which leaves the ceramic mold. The ceramic mold is then used to produce the metal parts for the pump. The ceramic mold produces high quality castings having a good surface finish and dimensional accuracy. However, investment casting tooling is expensive and is best suited to small size, mass produced parts. For custom designed pumps, the parameters of the pump need to match the performance characteristics that are desired. Flexibility in the design is important to achieving the performance objectives and this does not fit well with the use of mass produced parts. Accordingly, custom designed pumps are not a good fit with investment casting technology.

The internal casing components, such as the volute and diffuser, can be machined from solid metal stock. Such machining can produce precise dimension control and a good surface finish. However, the cross section of the volute is limited to parallel wall design configurations as the machining tools must be inserted and removed from the interior of the casing. There is little flexibility in the shape that can be machined under such restrictions. These restrictions on the shape of the internal chamber of the volute significantly limit the performance and efficiency characteristics of a pump produced with this technology.

Sand castings can also be used to produce pump casings. However, sand casting does not work well for the internal casings of small pumps or turbines, as the surface finish produced is not smooth enough for good efficiency. Without the necessary level of efficiency such small pumps and turbines have a difficult time being a competitive product. In addition, the cores that are used to create the internal voids such as the volute can shift during the molding or pouring process. This results in the void area being both axially and radially displaced from the desired position. Such shifting results in uneven flow entrances and a loss of efficiency for the pump. In addition, the surface finish of such a cast pump casing is not as smooth as desired to obtain the best flow characteristics and efficiency. Some of the above deficiencies can be reduced by grinding or sanding operations on the cast casing provided that the required tools can fit into the areas that need further processing.

The present invention overcomes the deficiencies of the prior art and allows the construction of pumps that maximize the efficiency and performance for the pump and allows for the cost effective production of unique one off design and construction of volute flow passages

SUMMARY OF THE INVENTION

The present invention is directed to a pump and a construction of the internal passageways in the pump. The present invention utilizes a volute insert that is formed from more than one piece of material. The volute insert is usually radially split and is removably positioned in a cavity in the interior of the pump housing. The volute insert can be machined to achieve the desired shape for the flow characteristics of the volute as the pieces of the volute insert provide access for the necessary machine tools. The radial split for the volute insert provide improved accessibility that allows the machine tools to create shapes that were difficult to achieve in the prior art pump. The volute insert can also be removed and revised if the performance objectives of the pump change. In addition, an entirely new volute insert can be utilized if the changes in the design parameters require a change of this magnitude.

Other objects and advantages of the present invention will become apparent to those skilled in the art upon a review of the following detailed description of the preferred embodiments and the accompanying drawings.

BRIEF DESCRIPTION OF THE DRAWINGS

FIG. 6 is a cross section taken along line H-H in FIG. 3.

FIG. 7 is a cross section taken along line J-J in FIG. 3.

FIG. 11 is a cross section taken along line H-H in FIG. 8.

FIG. 12 is a cross section taken along line J-J in FIG. 8.

FIG. 21 is a cross section taken along line A-A in FIG. 20.

FIG. 22 is a cross section taken along line B-B in FIG. 20.

FIG. 23 is a cross section taken along line C-C in FIG. 20.

FIG. 24 is a cross section taken along line D-D in FIG. 20.

FIG. 33 is a cross sectional view of the turbine portion of a hydraulic turbocharger.

FIG. 34 is a cross sectional view of an insert that can be positioned in the inlet for the turbine portion of FIG. 33.

FIG. 35 is a front elevation view of the insert show in FIG. 34.

DETAILED DESCRIPTION OF THE PREFERRED EMBODIMENTS

This invention is directed to a new construction for a pump or a hydraulic turbocharger pump turbine product. In particular, the invention is directed to an improved volute and diffuser that can be utilized to increase the efficiency of the pump or hydraulic turbocharger device. The details of the invention will be readily understood by referring to the attached drawings in connection with the following description.

To facilitate the description of the device, it will be described in connection with a hydraulic turbocharger that is utilized for energy recovery. However, it should be understood that the present invention is suitable for use with almost any type of pump, turbine or hydraulic turbocharger application. The basic operation of a hydraulic turbocharger is described in U.S. Pat. Nos. 4,966,708 and 5,049,045 and the disclosure of this patent is hereby incorporated by reference into this patent application. Accordingly, the detailed operating features of the hydraulic turbocharger will not be described in detail herein.

Figure 1:
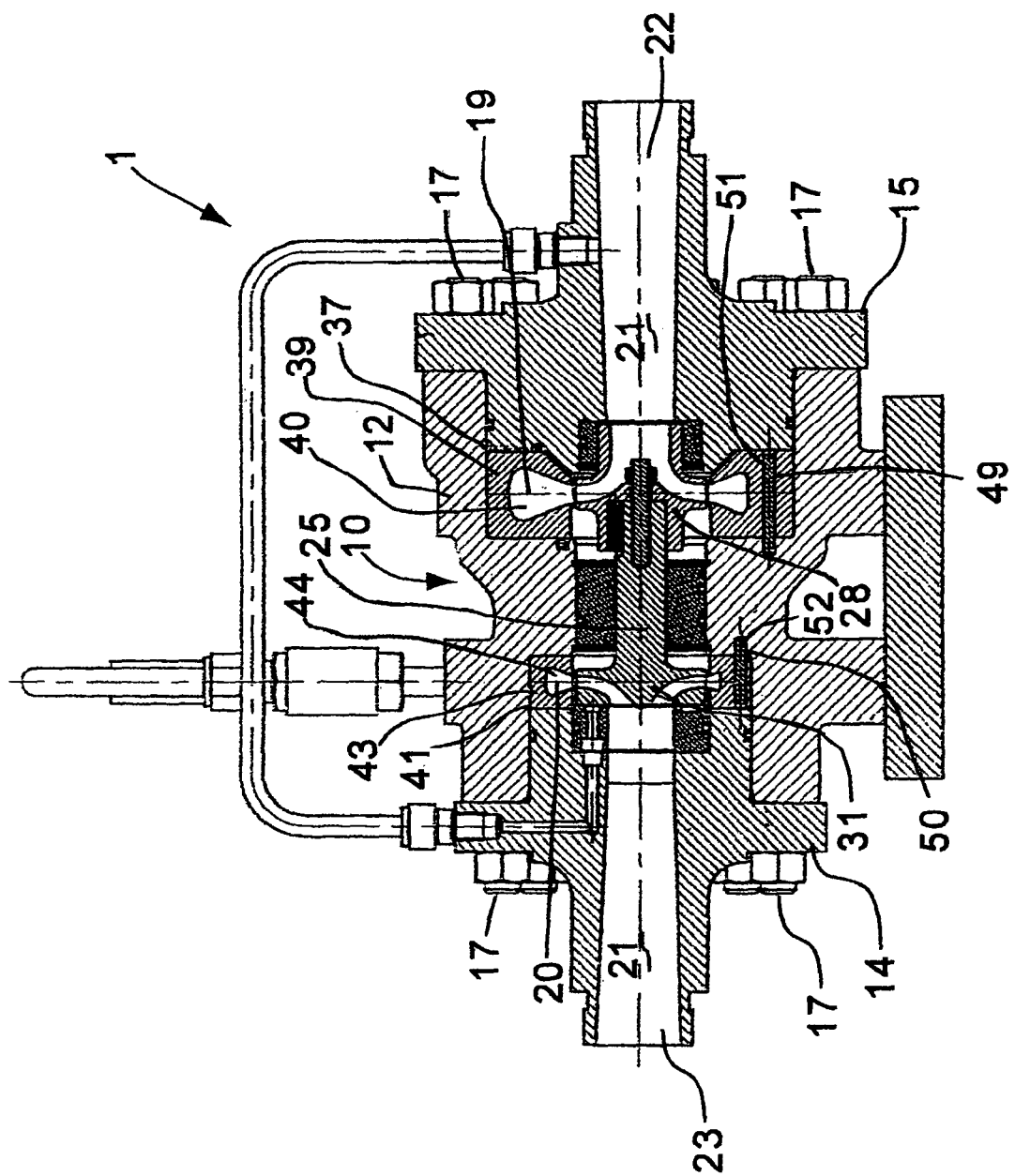
FIG. 1 is a cross sectional view of the hydraulic turbocharger volute insert of the present invention.
Figure 2:
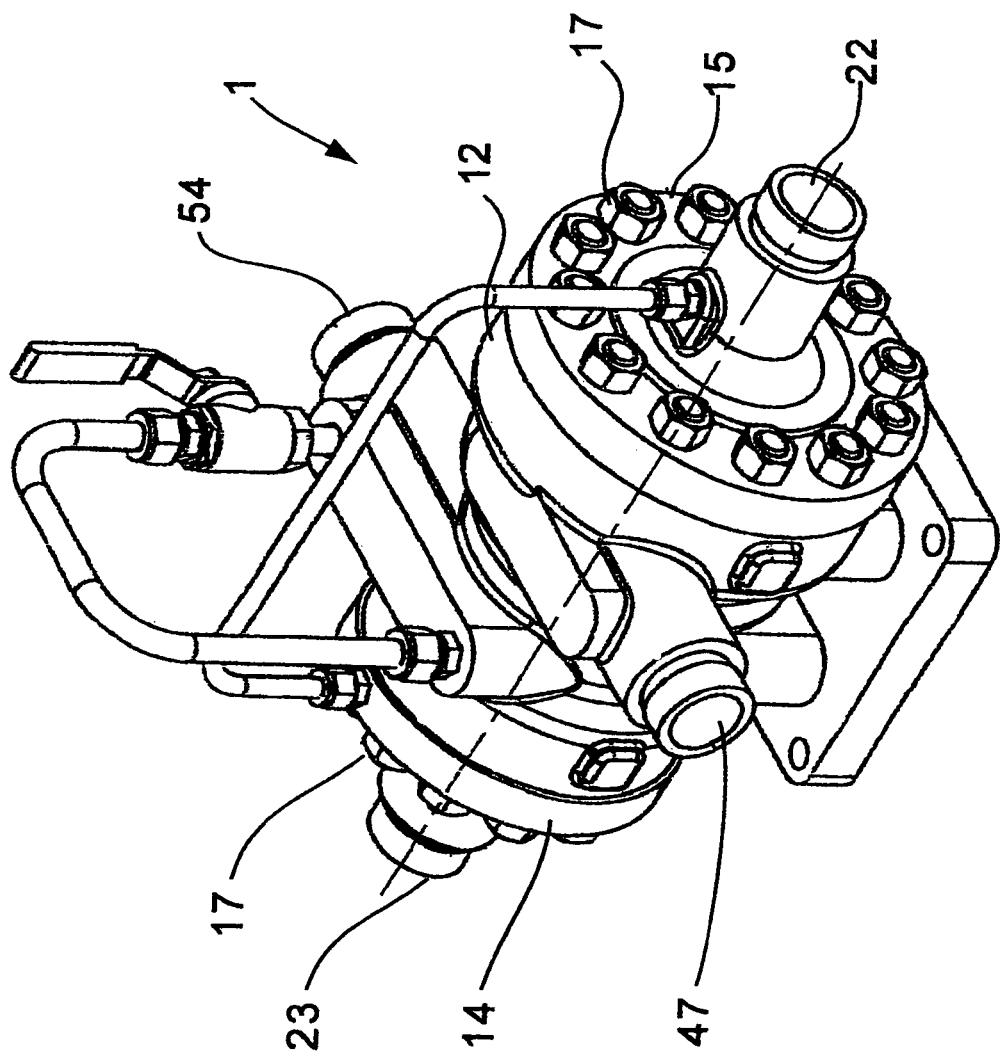
FIG. 2 is a perspective view of the hydraulic turbocharger of the present invention.

As shown in FIGS. 1 and 2 the hydraulic turbocharger 1 of the present invention has an outer housing 10. The outer housing 10 has a first section 12, a turbine end section 14 and a pump end section 15 wherein the turbine end section and pump end section are removably secured to the first section of the outer housing. A securing device such as bolts 17 can be utilized to removably secure the turbine end and pump end sections to the first section of the outer housing 10. The first section 12, the turbine end section 14 and the pump end section 15 of the outer housing 10 define a passageway 21 that extends through the outer housing.

A rotatable shaft 25 is rotatably positioned in the passageway 21. Positioned on the rotatable shaft 25 are a pump impeller 28 and turbine impeller 31. A first cavity 37 is formed between the first section 12 and the pump end section 15 of the outer housing 10 adjacent the pump impeller 28. A second cavity 41 is formed between the first section 12 turbine end section 14 of the outer housing 10 adjacent the turbine impeller 31. Removably positioned in the first cavity 37 is a pump volute insert 39 that forms pump volute 40 and removably positioned in the second cavity 41 is the turbine volute insert 43 that forms turbine volute 44. The pump volute insert 39 and the turbine volute insert 43 are formed of more than one piece. The volute inserts are preferably split along a radial axis. As shown in FIG. 1, the pump volute insert 39 is split along radial axis 19 and the turbine volute insert 43 is split along radial axis 20. The Volutes are stationary pump and turbine flow passages whose changing shape and flow area convert fluid velocity into pressure on the pump side and fluid pressure to velocity on the turbine side. The efficiency of the volute depends upon the precise shape and surface finish of its internal walls. The volute insert construction method allows for efficient production of unique one of a kind volute flow geometries optimized for maximum efficiency operation.

The material of the volute insert may be different than the material of the outer casing. For instance the outer casing, which is designed to withstand very high pressure is made of high strength stainless steel, while the volute inserts can be made of high hardness and high strength plastics, which are much easier to machine than stainless steel and produce extremely smooth surfaces with minimal finishing effort. Examples of suitable plastics that can be used for the volute inserts are erdalite, grade 1-PVC, Delrin and other suitable plastics. For most applications the plastic material should have very low water absolution properties. In practice, it has been found advantageous to the pump volute insert 39 and the turbine volute insert 43 to be formed of at least two pieces and to be split along a radial axis. With this radial split each piece of the inserts can be a mirror image of the other piece of the inserts.

The precise radial split is also advantageous to "mirror image" CNC machining, which saves considerable programming and set up time. The two split volutes are generally held in place by the first section 12 and by the turbine end section 14 and pump end section 15 of the outer housing 10. The pump volute insert 39 is in fluid communication with the pump impeller 28 and the inlet 22 formed by the passageway 21. A pump outlet 47 is positioned in the first section 12 of the outer housing 10 and the pump outlet 47 is also in fluid communication with the first cavity 37 defined by the pump volute insert 39. A bore 49 extends from the pump volute insert 39 into the first section 12 of the outer housing 10. A pin 51 can be positioned in the bore 49 to align the two pieces of the pump volute insert 39 in the proper orientation and to position the pump volute insert 39 in the desired location in the first cavity 37. The pin 51 also acts to prevent the pump volute insert 39 from rotating relative to the outer housing 10. The pin 51 can be positioned in the bore 49 before the pump end section 15 is secured to the first section 12.

The turbine volute insert 43 is in fluid communication with the turbine impeller 31 and with the discharge opening 23 formed by the passageway 21. The turbine volute insert 43 is also in fluid communication with the turbine inlet 54 formed in the first section 12 of the outer housing 10. A bore 50 extends from the turbine volute insert 43 into the first section 12 of the outer housing 10. A pin 52 can be positioned in the bore 50 to align the two pieces of the turbine volute insert 43 in the proper orientation and to position the turbine volute insert 43 in the desired location in the second cavity 41. The pin 52 also acts to prevent the turbine volute insert from rotating relative to the outer housing 10. The pin 52 can be positioned in the bore 50 before the turbine end section 14 is secured to the first section 12.

The outer housing 10, comprising the first section 12, turbine end section 14 and pump end section 15 is costly to make and requires significant lead time to design and manufacture. However, the performance requirement for each hydraulic turbocharger can vary depending on the parameters of use that are present in a particular application. This variability in performance characteristic can produce an almost infinite number of performance curves for the hydraulic turbocharger. It is not economically feasible to produce unique components for the outer housing 10 to maximize the efficiency for the hydraulic turbocharger. The present invention allows a standard outer housing to be designed and produced for a range of potential applications. The turbine impeller 31, pump impeller 28, pump volute insert 39 and turbine volute insert 43 can be individually designed to produce the maximum efficiency for the operational parameters of the hydraulic turbocharger. In most applications the turbine volute insert 43 and pump volute insert 39 are designed to cooperate with turbine impeller and pump impeller respectively to obtain the desired performance characteristics for the hydraulic turbocharger. The pump volute and turbine volute inserts can be designed and manufactured to achieve the desired characteristics. Since the pump and turbine volute inserts are positioned in the first cavity 37 and second cavity 41 respectively, the pump and turbine volute inserts can be custom designed to optimize the performance of the hydraulic turbocharger without requiring a custom design for the entire hydraulic turbocharger.

Figure 3:
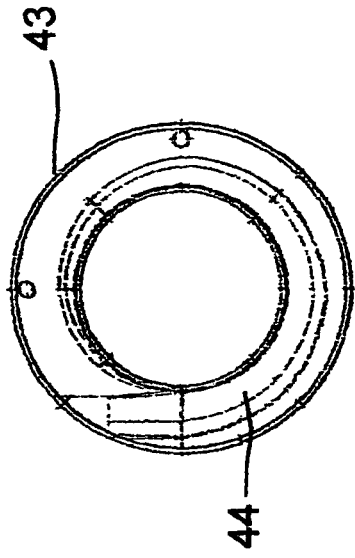
FIG. 3 is a detailed front elevation view of the turbine volute insert.
Figure 5:
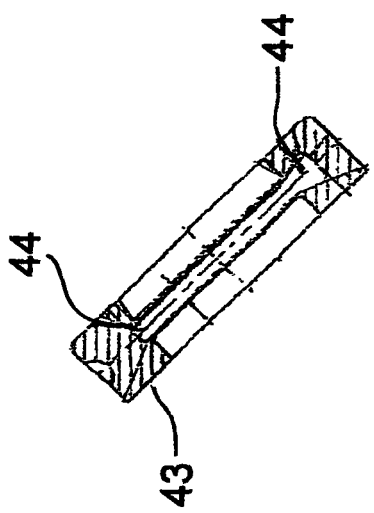
FIG. 5 is a cross section taken along line G-G in FIG. 3.
Figure 4:
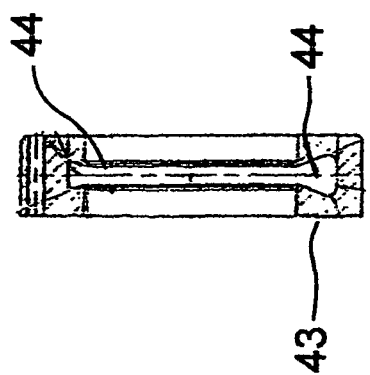
FIG. 4 is a cross section taken along line F-F in FIG. 3.
Figure 8:
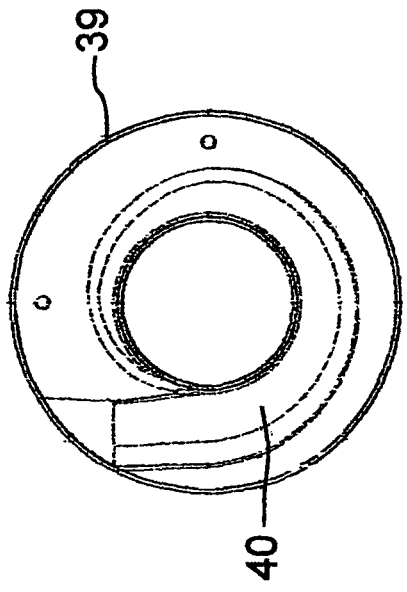
FIG. 8 is a detailed front elevation view of the pump volute insert.
Figure 10:
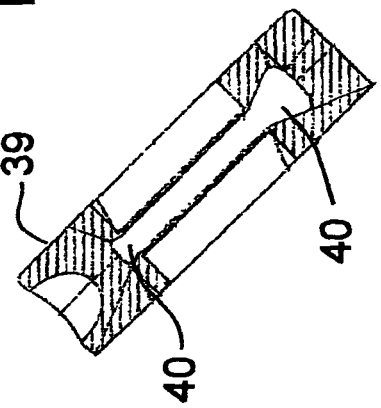
FIG. 10 is a cross section taken along line G-G in FIG. 8.
Figure 9:
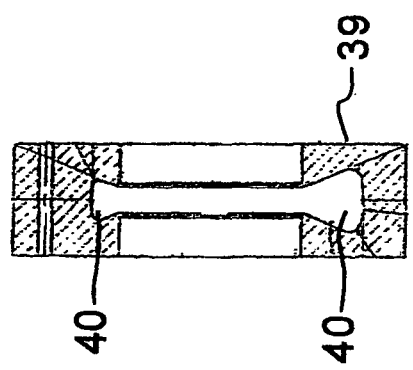
FIG. 9 is a cross section taken along line F-F in FIG. 8.
Figure 14:
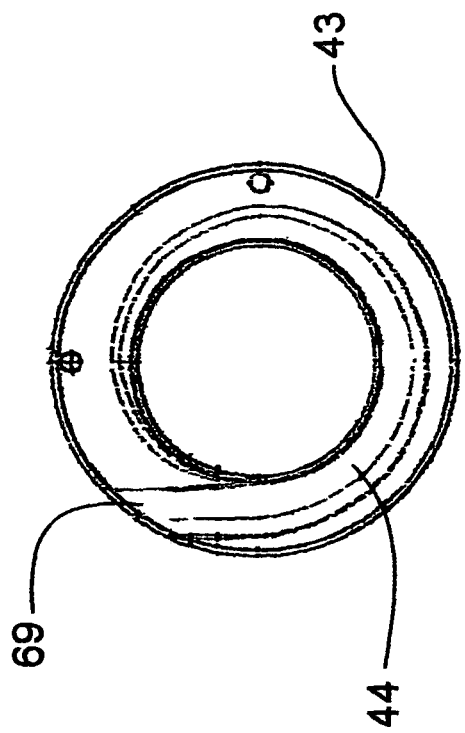
FIG. 14 is a detailed front elevation view of the turbine volute insert.
Figure 13:
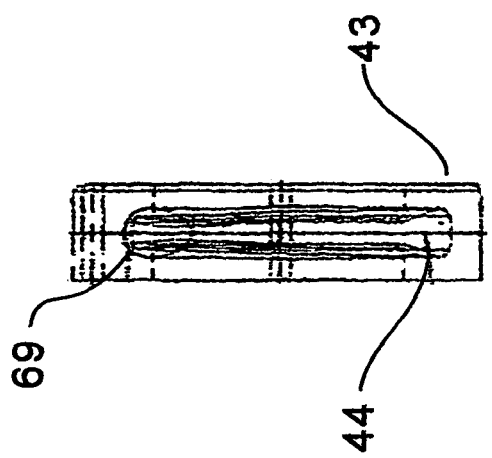
FIG. 13 is a cross sectional view of the turbine volute insert.
Figure 18:
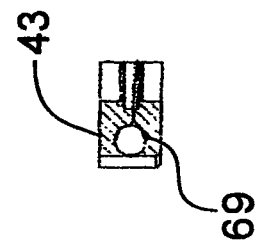
FIG. 18 is a cross section taken along line D-D in FIG. 14.
Figure 17:
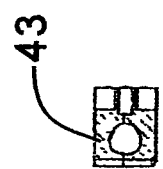
FIG. 17 is a cross section taken along line C-C in FIG. 14.
Figure 16:
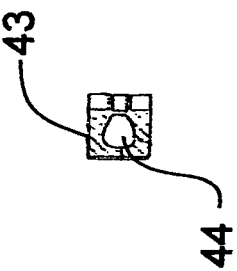
FIG. 16 is a cross section taken along line B-B in FIG. 14.
Figure 15:
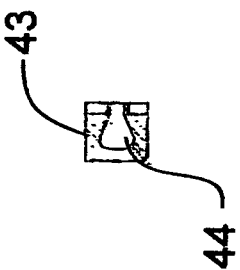
FIG. 15 is a cross section taken along line A-A in FIG. 14.
Figure 20:
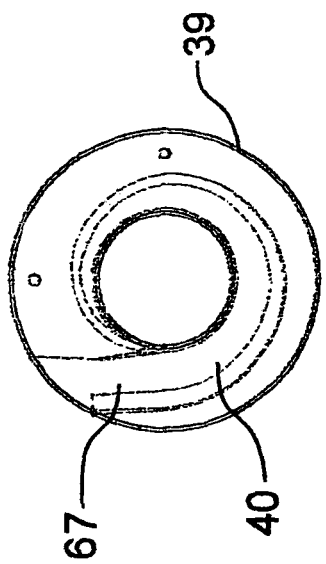
FIG. 20 is a detailed from elevation view of the pump volute insert.
Figure 19:
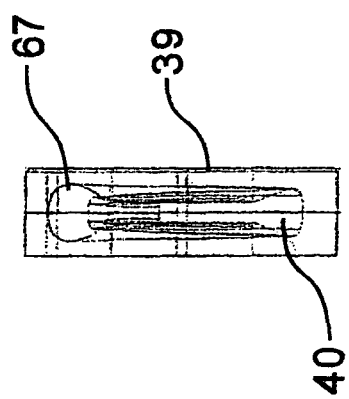
FIG. 19 is a cross sectional view of the pump volute insert.

The radially split pump volute insert 39 and turbine volute insert 43 can be machined to the desired geometry and surface finish prior to being installed in first cavity 37 and second cavity 41 respectively. FIG. 3 shows the details of the turbine volute 44 for the turbine volute insert 43. FIGS. 4, 5, 6 and 7 are cross sections of the turbine volute insert 43 taken at various locations and these figures show the types of changes in shape that can occur in the turbine volute 44 to achieve the desired efficiency in the turbine end of the hydraulic turbocharger 1. FIG. 8 shows the details of the pump volute 40 for the pump volute insert 39. FIGS. 9, 10, 11 and 12 are cross sections of the pump volute insert 39 taken at locations and these figures show the types of changes in shape that can occur in the pump volute 40 to achieve the desired efficiency in the pump end of the hydraulic turbocharger. The size and shape for the turbine and pump volutes is complex and varies to achieve the desired characteristics for the hydraulic turbocharger. A CNC milling machine can be used to precisely contour the internal shape of the two volutes. The CNC milling machine can utilize the design parameters created by machine design software to create a volute design that obtains the desired performance characteristics. The fact that the volutes are radially split allows the CNC milling machine or other metal working tools to have access to the interior of the volute in a way that complex shapes, including diverging wall configurations can be produced. The machining of the volute interior allows a volute shape to be produced that enhances the flow characteristics and efficiency of the pump. In addition, the volute inserts can be removed, further machined or replaced with new inserts if it is desirable to change the performance characteristics of the hydraulic turbocharger. FIG. 13 shows the transition from the turbine volute 44 to the turbine inlet nozzle 69. The turbine volute usually has a trapezoidal cross section shape, although other cross sectional shapes maybe used, and the turbine inlet nozzle 69 has a circular cross sectional shape. FIG. 14 shows the details of the turbine volute insert 43 and FIGS. 15-18 are cross sections that show the change in shape for the turbine volute 44 in the transition from the turbine volute to the turbine inlet nozzle 69. FIG. 19 shows the transition from the pump volute 40 to the conical pump diffuser 67. The pump volute usually has a trapezoid cross section shape, although other cross sectional shapes maybe used, and the pump diffuser 67 is conical with a generally circular cross sectional shape. FIG. 20 shows the details of the pump volute insert 39 and FIGS. 21-24 are cross sections that show the change in shape for the pump volute 40 in the transition from the pump volute to pump diffuser 67. The outer diameter of the volute insert determines how much axial length is available to effect a transition that minimizes flow turbulence and efficiency losses.

Figure 25:
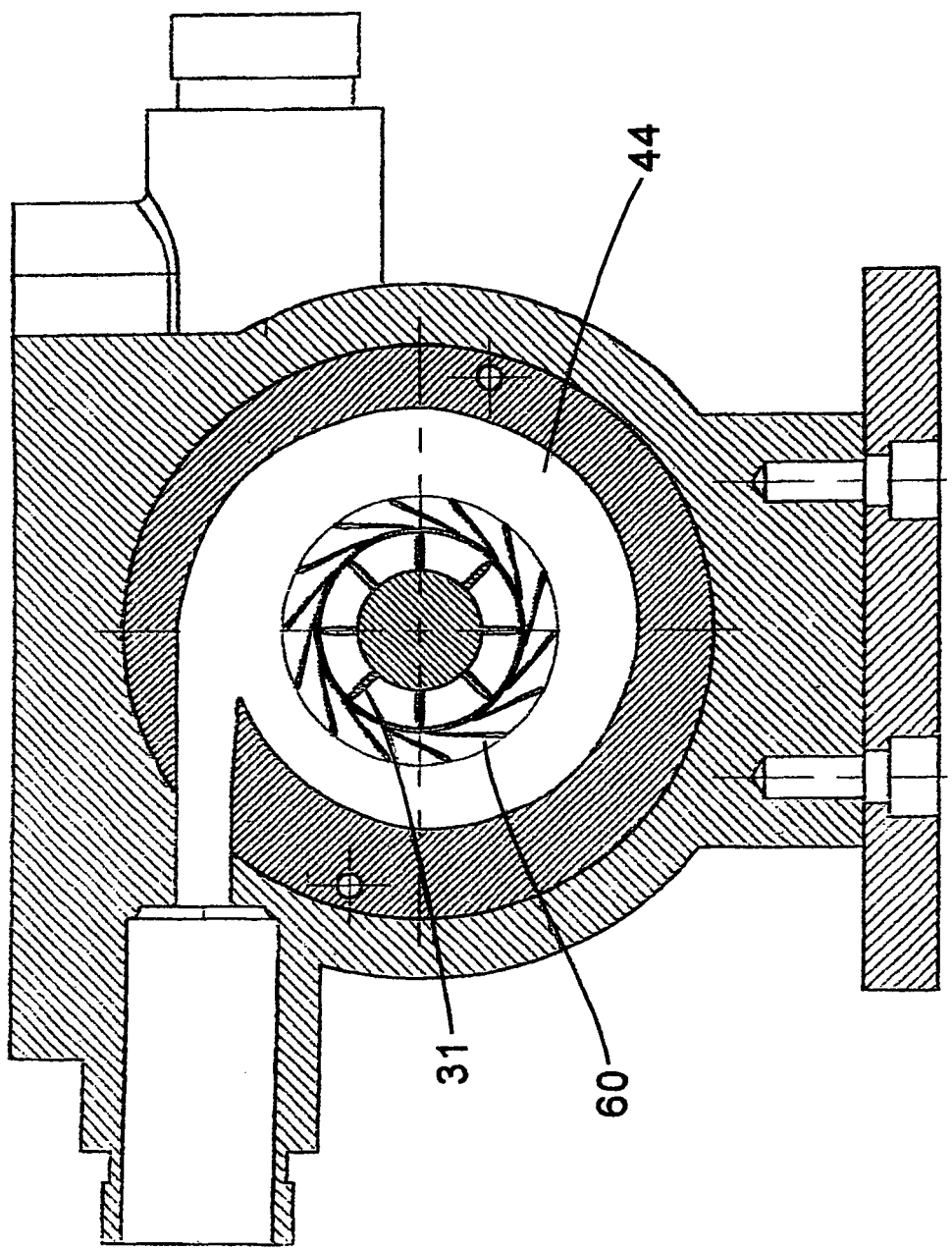
FIG. 25 is a cross sectional view of the turbine end of the hydraulic turbocharger.

The volute insert design can also be used with volutes that contain nozzle rings on the turbine side and diffuser rings on the pump side. As shown in FIG. 25 the nozzle rings 60 control the transition between the turbine volute 44 and the turbine impeller 31. The specific configuration of the turbine and pump volutes controls the efficiency of the unit. Frequently, rather minor changes can have a significant impartment in the efficiency rating for a pump or turbine. For large volutes on large pumps or turbines, the split volute pieces can be cast to obtain the approximate shape and then machining can be used to finalize the shape.

In operation, high pressure fluid enters the turbine inlet 54 and is directed to the turbine volute 44 formed by the turbine volute insert 43. The fluid is directed from the turbine volute 44 to the impeller 31, which is caused to rotate by impulse and reaction effects of the fluid on the turbine vanes machined or cast into the turbine impeller 31. The rotating turbine impellers power output is transmitted through the rotatable shaft 25 to the pump impeller 28. The turbine impeller 31 decreases the pressure on the fluid that enters the turbine side of the hydraulic turbocharger 1 and the fluid is discharged through discharge opening 23 on the passageway 21.

In operation, fluid at low pressure enters the inlet 22 of the passageway 21 and enters the pump impeller 28. The rotating impeller vanes cause the fluid to accelerate towards the periphery of the impeller. The high velocity fluid exits the impeller to enter the volute, where the increasing flow area of the volute collects the impeller flow. The fluid leaves the volute and then enters the conical diffuser where increasing area produces a reduction in fluid velocity and increase in fluid pressure.

Figure 26:
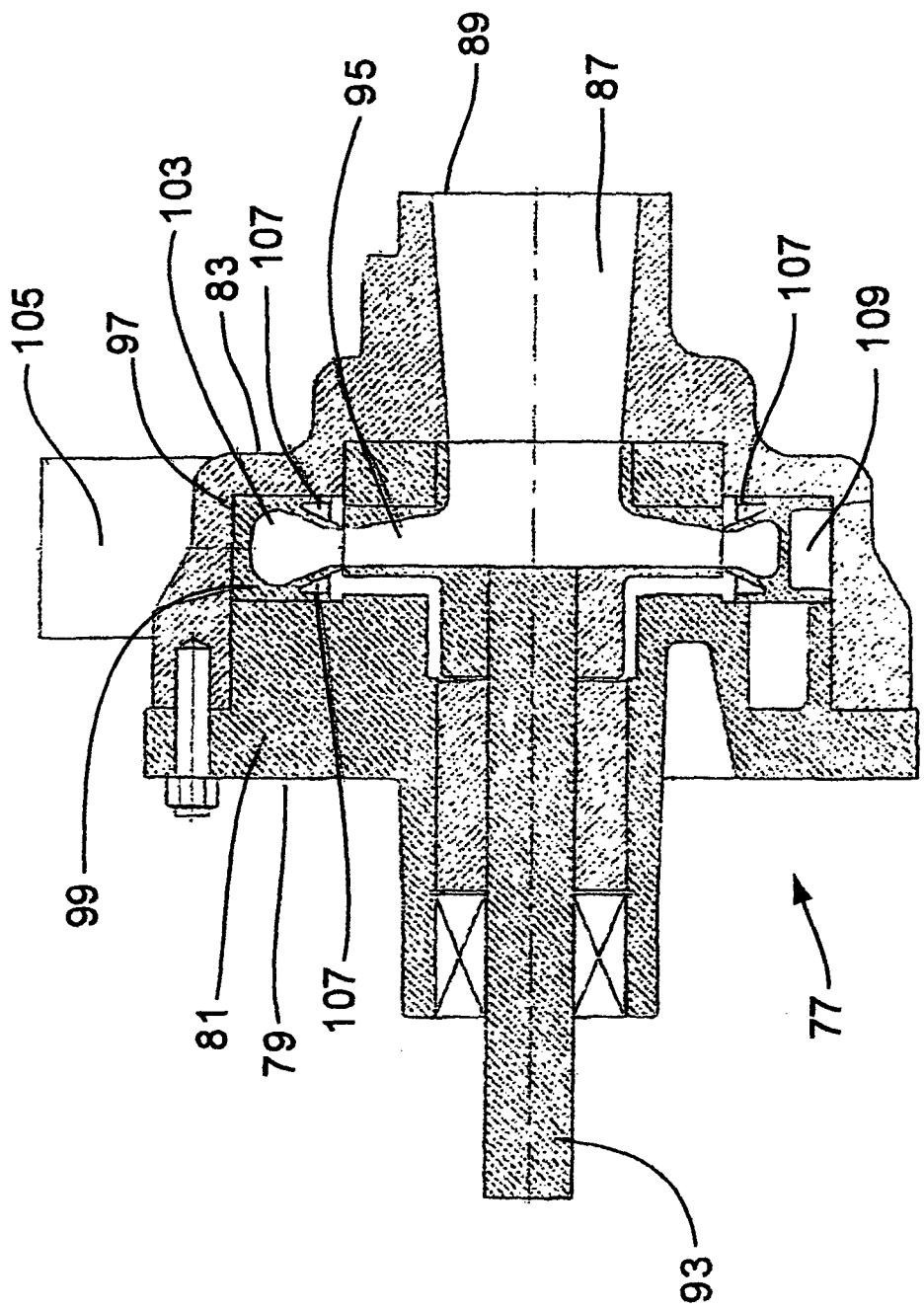
FIG. 26 is a cross sectional view of an externally driven pump utilizing the pump volute insert of the present invention.

FIG. 26 illustrates a volute insert design of the present invention that can be used with an externally driven pump. The pump 77 has an outer housing 79 comprising a first section 81 and a pump end section 83 that is removably secured to the first section. A passageway 87 extends through the outer housing and defines an inlet 89 for the pump 77. A shaft 93 is rotatably positioned in the passageway 87 and a pump impeller 95 is secured to the shaft. A cavity 97 is defined in the outer housing between the first section 81 and the pump end section 83. The cavity 97 is disposed adjacent the pump impeller 95. A pump volute insert 99 is positioned in the cavity 97 and defines the pump volute 103. The pump volute insert 99 is radically split along axis 105 and is usually formed of two pieces so that the pump volute 103 can be machined in the pump volute insert 99 as previously described. The shaft 93 and pump impeller caused to rotate by means of an external drive (not shown) as is well known in the art. The same design can be utilized with modification by addition of cross over and return channels to multistage pumps.

Figure 27:
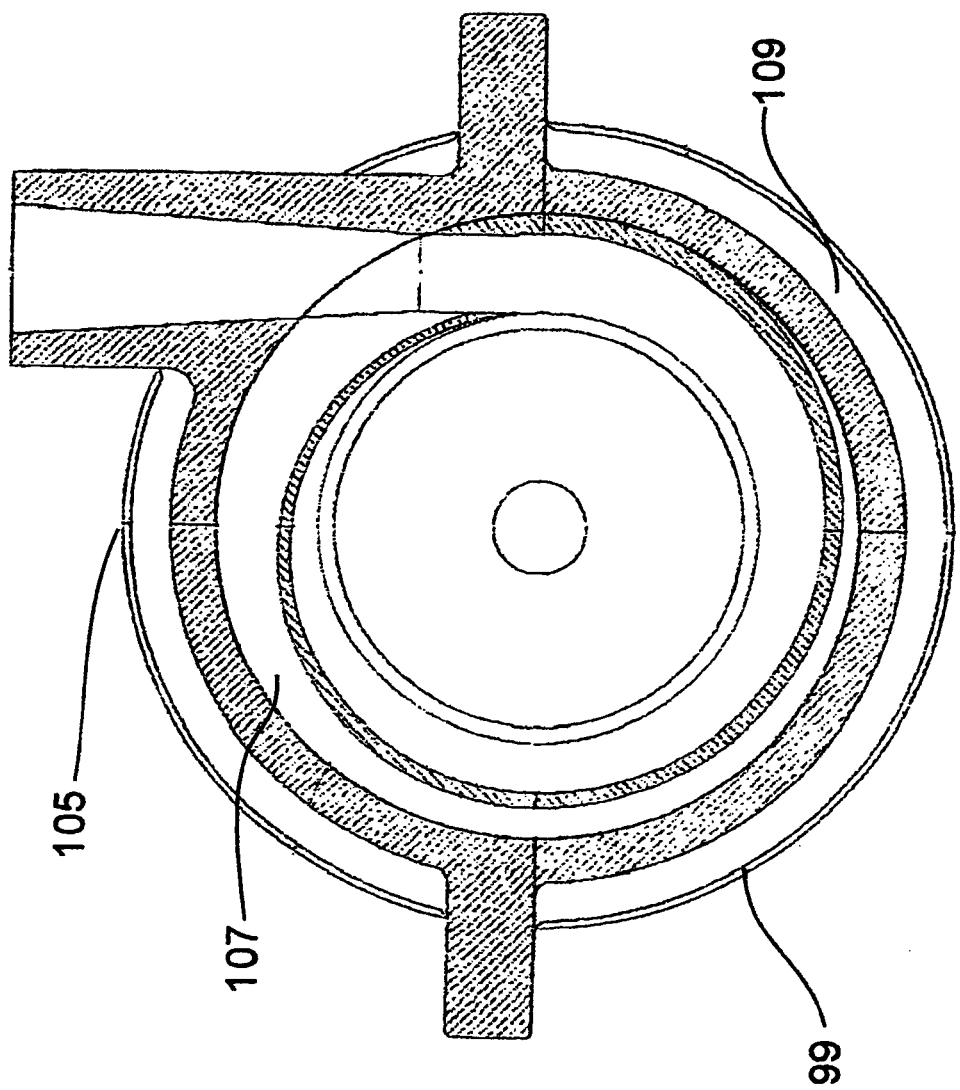
FIG. 27 is a cross sectional view of the pump volute insert shown in FIG. 27.

FIG. 27 is a cross section of the volute insert shown in FIG. 26. The complex shape for the pump volute 103 is shown in this figure. For larger pump volute inserts it may be desirable to remove excess material from the pump volute insert 99 to same material and to reduce the cost of the insert. As shown in FIGS. 26 and 27 material has been removed from areas 107 adjacent to the pump impeller and from radial area 109 on a portion of the outer periphery of the pump volute insert 99. The material can be removed from the pump volute insert in any acceptable manner. However, in practice it has been found to be desirable to mold each half of the pump volute insert 99 into a rough shape with areas 107 and radial area 109 removed. The pump volute 103 can then be machined to the desired final configuration in the pump volute insert 99.

Figure 28:
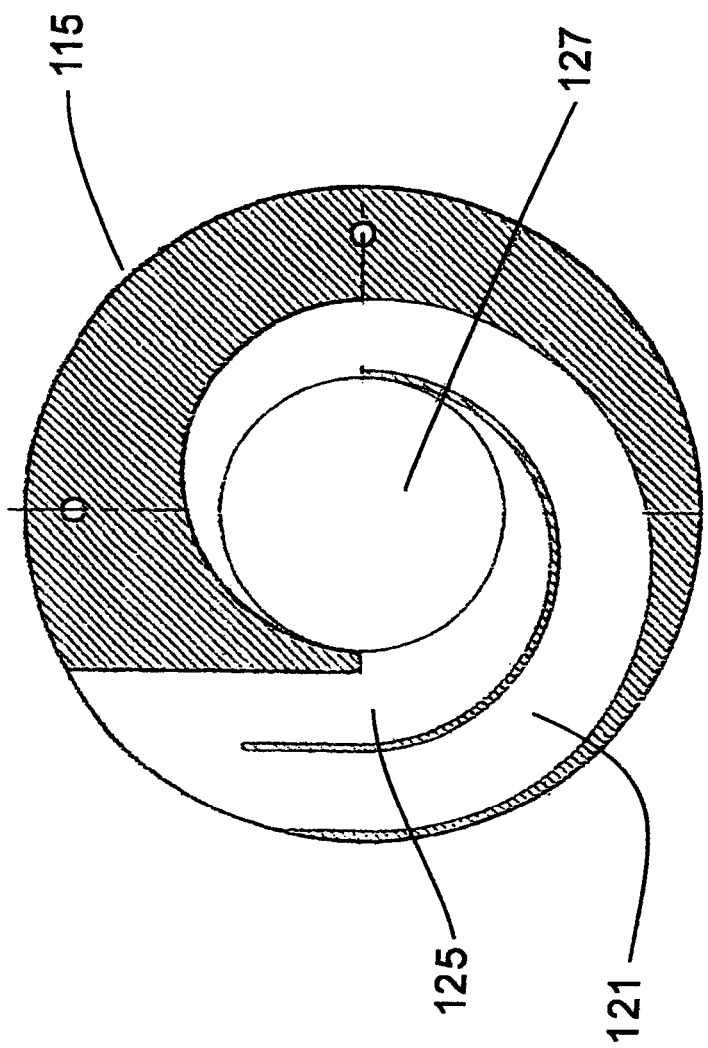
FIG. 28 is a cross sectional view of a pump volute insert having multiple volute passageways.

Another feature that can be utilized with the invention is an insert that defines multiple volute passageways. As show in FIG. 28 there is an insert 115 that defines a first volute passageway 121 and a second volute passageway 125. The insert 115 is radially split along line 127 so that the first and second volute passageways can be machined as previously described. In fact the insert 115 is positioned in a cavity and functions substantially in the same manner as the previously described inserts. The only difference for the insert 115 is that it defines more than one volute passageway. Multiple volute passageways are used to balance radial hydraulic forces that occur when the pump is operating at conditions that are not the optimum design conditions for the pump. When the pump is operating at such off design conditions there are usually unbalanced radial hydraulic forces created in the volute of the pump. The first volute passageway 121 and second volute passageway 125 are spaced 180 degrees apart so that the first and second volute passageways are effectively in opposed relationship and the radial hydraulic forces created in the first volute passageway 121 act against the radial hydraulic forces created in the second volute passageway 125. The first and second volute passageways in the insert 115 are disposed so that any radial hydraulic forces created in the first and second volute passageways act in opposite directions and effectively cancel each other. More than two volute passageways can be formed in the insert 115. However, the volute passageways should be symmetrically spaced so that the radial hydraulic forces are balanced for the insert. Because of the radial split for the insert 115, the volute passageways can be readily machined to form a single, double, triple or any number of volute passageways. All of the deficiencies of casting or other methods of creating a volute passageway, as previously discussed, are even more problematic when creating multiple volute passageways. Machining the multiple volute passageways also allows the inserts to be used on smaller pumps to expand the range of pumps that can utilize the operational advantage of balancing radial hydraulic forces.

Figure 31:
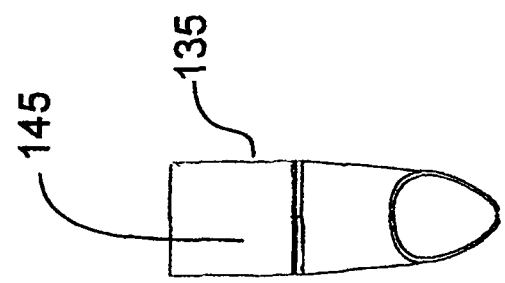
FIG. 31 is a first elevation view of the insert shown in FIG. 3c.
Figure 30:
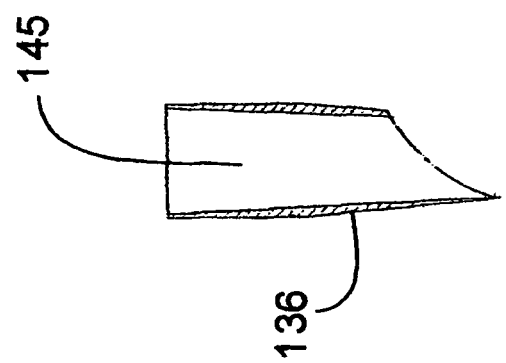
FIG. 30 is a cross sectional view of an insert that can be positioned in the inlet for the pump portion show in FIG. 29.
Figure 29:
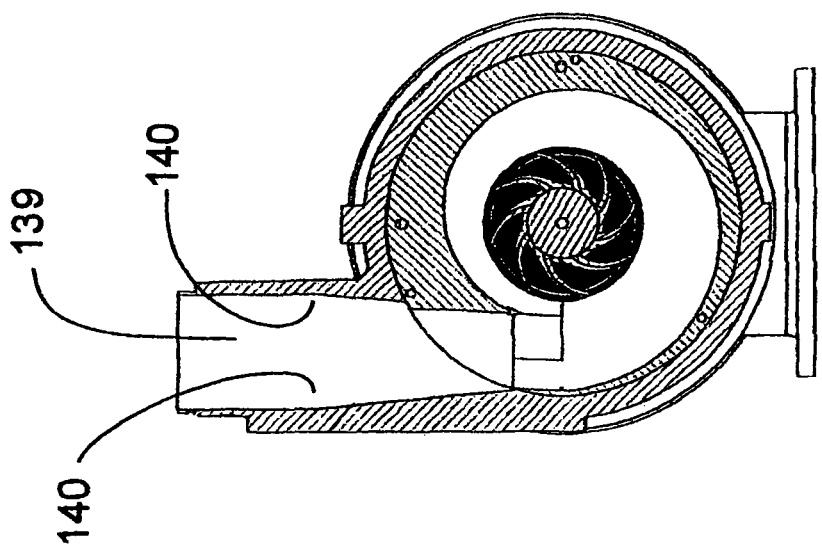
FIG. 29 is a cross sectional view of the pump portion of a hydraulic turbocharger.

FIGS. 29-34 show additional features that can be utilized with the pump or hydraulic turbocharger of the present invention. As shown in FIGS. 29-31 a removable pump diffuser insert 135 is positioned in the outlet 139 for the pump portion of a hydraulic turbocharger. The outlet 139 has a tapered sidewall 140 and the diffuser insert 135 has a taper on the exterior surface 136 that mattingly engages the taper of the sidewall 140. The taper of the sidewall 140 acts to position the diffuser insert 135 in the outlet 139. However, it should be understood that the sidewall 140 of the outlet 139 and the diffuser insert 135 can have a straight or non-tapered shape if desired. In addition, a locating or positioning feature can be incorporated into the outlet and the insert to ensure that the insert is properly oriented in the outlet. The diffuser insert 135 is secured into place by tack welds 141 on the end of the outlet that is spaced apart from the pump. The tack welds 141 are designed to securely, but removably, position the diffuser insert 135 in the outlet 139. The diffuser insert 135 defines a bore and the bore can be sized to provide the most efficient operating characteristics for the pump. The shape of the diffuser in the outlet 139 has an impact on the efficiency of the operation of the pump and interacts with the configuration of the previously described volute in the pump. If the volute insert that form the volute are modified or replaced as previously discussed in this application, the changes in the volute may change the efficient interconnection with the diffuser in the outlet 139. To allow for changes in the volute to be made with the most efficiency for the pump, the diffuser insert 135 can be removed, modified or replaced with a new diffuser insert, to provide a diffuser inlet that has a shape or configuration that most efficiently interacts with the volute for the pump.

Figure 32:
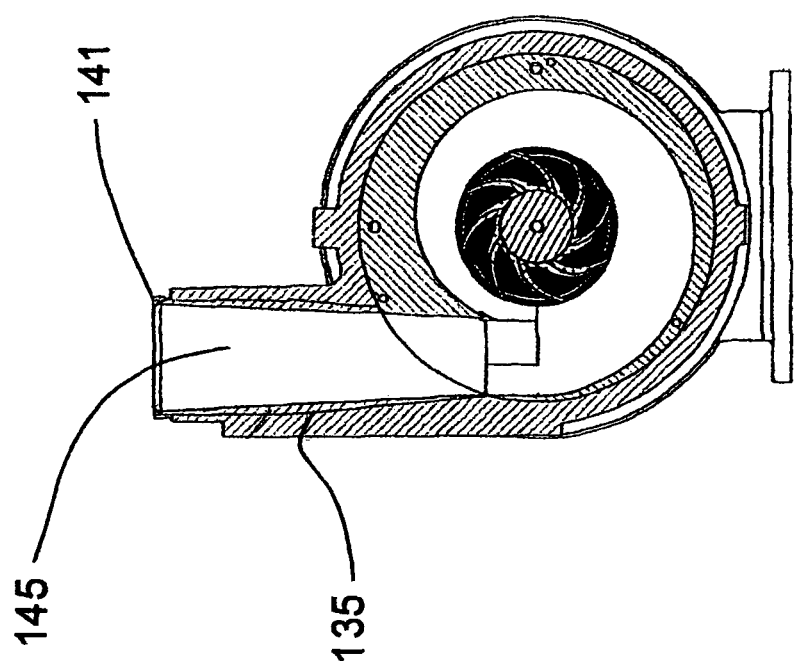
FIG. 32 is a cross sectional view of the pump portion of a hydraulic turbocharger with the insert positioned in the inlet.
Figure 36:
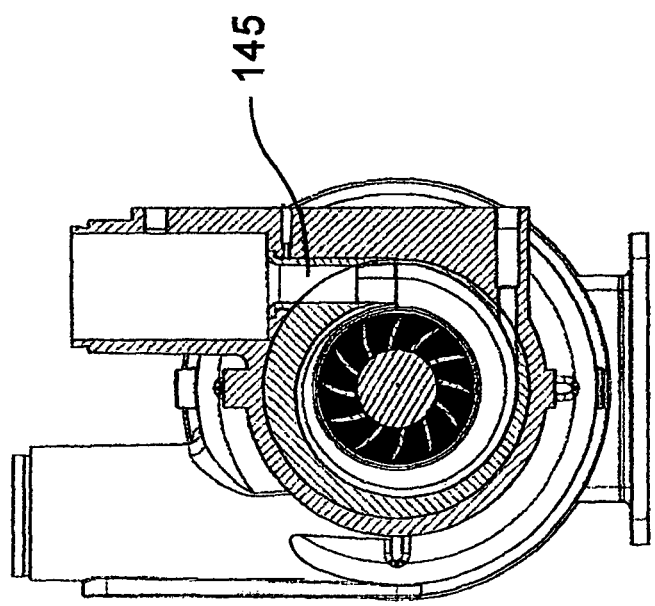
FIG. 36 is a cross sectional view of a turbine portion of a hydraulic turbocharger with the insert positioned in the inlet.

FIGS. 32-34 show a removable turbine nozzle insert 145 that is positioned in the inlet 149 for the turbine portion of a hydraulic turbocharger. The inlet 149 has a shoulder 151 that is defined at the inlet end of the inlet. The nozzle insert 145 has a flange 146 that engages the shoulder 151 to position the nozzle insert in the proper location in the inlet 149. The nozzle insert 145 is designed to be positioned in the inlet 149 in a particular orientation to direct the flow of fluid into the turbine portion of the hydraulic turbocharger. The nozzle insert has a flat section 147 that is disposed to be in alignment with a set screw in the inlet 149 when the nozzle insert is in the proper position. The set screw releasably secures the nozzle insert in the inlet 149. The nozzle insert 145 defines a passageway 148 and the passageway can be sized to provide the most efficient operational characteristics for the turbine. The nozzle insert 145 can be removed and replaced with a different insert to accommodate changes made to the volute for the turbine. The combination of replaceable turbine volute inserts, as previously described, with the replaceable nozzle insert 145 allow the turbine portion of the hydraulic turbocharger to be modified to provide the most desired or efficient operating characteristics for the turbine portion of the hydraulic turbocharger.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:
1. A hydraulic turbocharger comprising:
an outer housing having a first section, a turbine end section, and a pump end section, said turbine end and pump end sections being removably secured to said first section, said outer housing defining a passageway, said passageway defining an inlet and an outlet for said pump and an inlet and an outlet for said turbine;
a rotatable impeller positioned in said passageway, said impeller having a first set of vanes in fluid communication with the inlet and outlet for said pump and a second set of vanes in fluid communication with said inlet and outlet for said turbine;
a first cavity formed between said first section and said turbine end section adjacent said first set of vanes and a second cavity formed between said first section and said pump end section adjacent said second set of vanes;
a first insert removably positioned in said first cavity and a second insert removably positioned in said second cavity, said first and second inserts being formed of more than one piece and said first insert defining the volute adjacent said first set of vanes and said second insert defining said volute adjacent said second set of vanes, wherein each said piece defines a portion of said volute, each said piece being a mirror image of a second one of said pieces for each of said first and second inserts, said first and second inserts being designed to be machined when not positioned in said first and second cavities to form said volute, when said first and second inserts are positioned in said first and second cavities respectively said first and second inserts being radially split to allow access to the volute defined by the inserts,
whereby the configuration of said volute can be formed in a manner to enhance the efficiency of said hydraulic turbocharger, wherein a shape and a flow area of said volute is configured to convert fluid velocity into pressure on said pump end section and fluid pressure to velocity on said turbine end section;

a third removable insert positioned in said outlet for said pump, said third removable insert defining a bore wherein said bore is designed to interact with said volute in said pump to enhance the efficiency of said hydraulic turbocharger; and a fourth removable insert positioned in said inlet for said turbine, said insert defining a passageway wherein said passageway is designed to interact with said volute in said turbine to enhance the efficiency of said hydraulic turbocharger, whereby said first and second inserts and said third and fourth removable inserts positioned in said outlet and said inlet can be individually designed or modified to accommodate changes in the operational parameters for said hydraulic turbocharger to customize the design and maximize the efficiency of said hydraulic turbocharger without changing the other components of said hydraulic turbocharger.

2. The hydraulic turbocharger of claim 1 wherein the first and second inserts are formed of two pieces.

3. The hydraulic turbocharger of claim 2 wherein the first and second inserts are formed in two equal pieces.

4. The hydraulic turbocharger of claim 1 wherein the first and second inserts are formed of a material that is the same as the material of the outer housing.

5. The volute insert of claim 1 wherein the first and second inserts define more than one volute passageway whereby the hydraulic forces produced in the volute passageways are balanced.

6. The volute insert of claim 5 wherein two volute passageways are defined in the first and second inserts.

7. The volute insert of claim 6 wherein the two volute passageways are positioned to be in substantially hydraulically opposed relationship whereby the forces generated in the volute passageways defined by the first and second inserts act in opposite directions and balance the forces.

8. The volute inserts of claim 5 wherein the first and second inserts define more than two volute passageways and the more than two volute passageways are positioned in symmetrical relationship whereby the hydraulic forces produced in the volute passageways are balanced.

9. The hydraulic turbocharger of claim 1 wherein the first and second inserts are formed of a material that is different than the material of the outer housing.

\* \* \* \* \*